Nov. 22, 1938.         J. E. JONES         2,137,721
                    MOTOR CONTROL SYSTEM
                    Filed Jan. 14, 1938
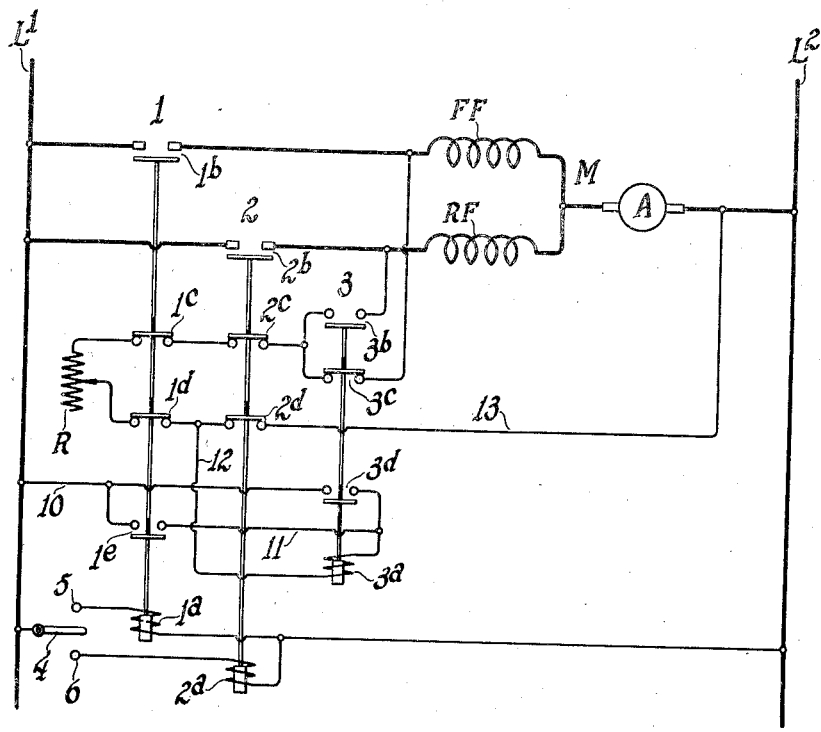
Inventor
Jesse E. Jones
By Frank H. Hubbard
Attorney Patented Nov. 22, 1938

2,137,721

UNITED STATES PATENT OFFICE 2,137,721

MOTOR CONTROL SYSTEM

Jesse E. Jones, Milwaukee, Wis., assignor to Cutler-Hammer, Inc., Milwaukee, Wis., a corporation of Delaware Application January 14, 1938, Serial No. 184,964

4 Claims. (Cl. 172—179)

This invention relates to motor control systems, and more particularly to reversing controllers for series motors having separate forward and reverse series field windings.

The invention has among its objects to provide an efficient and reliable reversing controller for motors of the aforesaid type having improved dynamic braking control means associated therewith.

A further object is to provide a controller for motors of the aforesaid type having novel automatic means for setting up connections to provide for dynamic braking under the action of the reverse field winding upon interruption of forward power connections for the motor and for dynamic braking under the action of the forward field winding upon interruption of reverse power connections for the motor.

Another object is to provide a controller of the aforesaid type having a single braking resistance for regulating dynamic braking by either of the field windings.

Various other objects and advantages of the invention will hereinafter appear.

The accompanying drawing diagrammatically illustrates a controller embodying the invention, it being understood that various modifications may be made in the embodiment illustrated without departing from the spirit and scope of the appended claims.

Referring to the drawing, the same illustrates a direct current motor M to be supplied with current from a supply circuit indicated by lines $L^1$—$L^2$, said motor being provided with an armature A, a forward series field winding FF and a reverse field winding RF.

The control means for motor M includes a pair of electromagnetic reversing switches 1 and 2, an electromagnetic selector switch 3 for selectively setting up forward and reverse dynamic braking connections for said motor, and a pilot switch 6 for selectively controlling said reversing switches.

Reversing switch 1 is provided with a set of normally open contacts $1^b$ for connecting armature A, and forward field winding FF in series across lines $L^1$—$L^2$ for forward operation of the motor and reversing switch 2 is provided with a set of normally open contacts $2^b$ for connecting armature A and reverse field winding RF in series across lines $L^1$—$L^2$ for reverse operation of the motor. Pilot switch 4 is movable in one direction into engagement with a stationary contact 5 to connect the operating winding $1^a$ of reversing switch 1 across supply lines $L^1$—$L^2$ and in an opposite direction into engagement with a stationary contact 6 to connect the operating winding $2^a$ of reversing switch 2 across said supply lines.

The reversing switches 1 and 2 are also each provided with two sets of normally closed contacts $c$ and $d$ for controlling dynamic braking connections for the motor including an adjustable resistance R, and reversing switch 1 is provided with a set of normally open contacts $e$ for establishing an energizing circuit for the operating winding $3^a$ of selector switch 3 through the medium of contacts $2^d$ of reversing switch 2.

Selector switch 3 is provided with a set of normally open contacts $3^b$ for establishing connections to provide for dynamic braking of the motor under the action of series field RF and a set of normally closed contacts $3^c$ for establishing connections to provide for dynamic braking of the motor under the action of series field FF. Selector switch 3 is also provided with a set of normally open contacts $3^d$ for establishing a maintaining circuit for its operating winding $3^a$ through the medium of contacts $2^d$ of reversing switch 2.

The function and operation of the aforedescribed controller and also the circuit connections therefor will now be more fully described. Upon movement of pilot switch 4 into engagement with stationary contact 5 the operating winding $1^a$ of reversing switch 1 is connected across lines $L^1$—$L^2$ and upon response of said reversing switch the contacts $1^b$ thereof connect armature A and field winding FF in series across lines $L^1$—$L^2$ for operation of the motor in its forward direction. Upon response of reversing switch 1 contacts $1^c$ and $1^d$ open to interrupt dynamic braking connections for the motor and contacts $1^b$ close to establish an energizing circuit for selector switch 3 extending from line $L^1$ by conductor 10 through the contacts $1^e$, by conductor 11 through the operating winding $3^a$ of said selector switch, by conductor 12 through contacts $2^d$ of reversing switch 2 and by conductor 13 to line $L^2$. Selector switch 3 thus responds to close its contacts $3^b$ and $3^d$ and open its contacts $3^c$.

Operation of motor M in its forward direction is stopped by moving pilot switch 4 out of engagement with its cooperating stationary contact 5 to deenergize reversing switch 1. Reversing switch 1 when deenergized drops out immediately, but selector switch 3 is maintained energized by a circuit extending from line $L^1$ through conductor 10, through contacts $3^d$, through the operating winding $3^a$, by conductor 12 through contacts $2^d$ of reversing switch 2 and by conductor 13 to line $L^2$. A dynamic braking circuit is then established to effect stopping of the motor, such circuit extending from the left hand terminal of armature A through reverse field winding RF, through contacts 3$^b$ of selector switch 3, through contacts 2$^c$ and 1$^c$ of the reversing switches, through resistance R, through contacts 1$^d$ and 2$^d$ of the reversing switches, and by conductor 13 to the right hand terminal of armature A.

As hereinbefore set forth, selector switch 3 in responding is maintained in its attracted position through the medium of its associated contacts 3$^d$ and the contacts 2$^d$ of reversing switch 2. However, upon movement of pilot switch 4 into engagement with its associated contact 6 the operating winding of reversing switch 2 is connected across lines L$^1$—L$^2$ and said reversing switch in responding opens its contacts 2$^d$ to interrupt the maintaining circuit for selector switch 3 and closes its contacts 2$^b$ to connect armature A and field winding RF in series across lines L$^1$—L$^2$ for operation of motor M in its reverse direction. The motor continues to operate in its reverse direction until the energizing circuit for reversing switch 2 is interrupted by movement of pilot switch 4 out of engagement with its associated contact 6. Reversing switch 2 then drops out and since selector switch 3 is now in normal position the motor is stopped under the action of a dynamic braking circuit extending from the left hand terminal of armature A, through the forward field winding FF, through contacts 3$^c$ of selector switch 3, through contacts 2$^c$ and 1$^c$ of the reversing switches, through resistance R, through contacts 1$^d$ and 2$^d$ of the reversing switches, and by conductor 13 to the right hand terminal of armature A.

In connection with the foregoing it should be noted that a single switch serves to selectively set up connections for dynamic braking of the motor in opposite directions. Also it should be noted that the circuit arrangement provides for regulation of the dynamic braking current by means of a single resistor.

What I claim as new and desire to secure by Letters Patent is:

1. The combination with an electric motor having an armature, and separate forward and reverse series field windings, of means for selectively controlling power connections for the motor to effect forward or reverse operation thereof, and dynamic braking control means for said motor including a selector switch controlled in accordance with the direction of operation of the motor for connecting said reverse field winding in shunt with said armature upon interruption of power connections for forward operation of said motor and for connecting said forward field winding in shunt with said armature upon interruption of power connections for reverse operation of said motor.

2. The combination with an electric motor having an armature and separate forward and reverse series field windings, of means for selectively controlling power connections for the motor to effect forward or reverse operation thereof, and dynamic braking control means for said motor including switches associated with said former means for connecting either of said field windings in shunt with said armature upon interruption of power connections for said motor and a selector switch associated with said former switches and controlled in accordance with the direction of operation of said motor to provide for connection of said reverse field winding in shunt with said motor armature upon interruption of power connections for forward operation of said motor and for connecting said forward field winding in shunt with said armature upon interruption of power connections for reverse operation of said motor.

3. The combination with an electric motor having an armature and separate forward and reverse series field windings, of means for selectively establishing power connections for effecting forward or reverse operation of said motor, a single braking resistance and dynamic braking control means for said motor including switches associated with said former means for connecting either of said field windings in shunt with said armature and in series with said resistance upon interruption of power connections for said motor and a selector switch associated with said former switches and controlled in accordance with the direction of operation of said motor to provide for connection of said reverse field winding in shunt with said motor armature upon interruption of power connections for forward operation of said motor and for connection of said forward field winding in shunt with said armature upon interruption of power connections for reverse operation of said motor.

4. The combination with an electric motor having an armature and separate forward and reverse series field windings, of reversing switches for selectively controlling power connections for said motor to effect forward or reverse operation thereof, switches associated with said reversing switches for connecting either of said field windings in shunt with said armature upon interruption of power connections for said motor, and electroresponsive switching means for selectively connecting said field windings to said former switches for control thereby, said switching means being controlled by said reversing switches to provide for connection of said reverse field winding in shunt with said motor armature upon interruption of power connections for forward operation of said motor and for connection of said forward field winding in shunt with said armature upon interruption of power connections for reverse operation of said motor.

JESSE E. JONES.